United States Patent [19]

Randall

[11] 4,131,441

[45] Dec. 26, 1978

[54] MULTI-SIZE RAIN HOOD

[75] Inventor: Everett H. Randall, Warwick, R.I.

[73] Assignee: Fram Corporation, East Providence, R.I.

[21] Appl. No.: 742,962

[22] Filed: Nov. 17, 1976

[51] Int. Cl.² ........................................... B01D 50/00
[52] U.S. Cl. .................................. 55/385 R; 55/505;
98/2.17; 180/69.01
[58] Field of Search ............ 55/385 R, 385 B, 385 F,
55/505, 509; 180/69 R, 69.01, 54 A; 285/177;
98/2.17, 18; 220/306, 307; 138/96 R, 96 T

[56] References Cited

U.S. PATENT DOCUMENTS

| 3,080,090 | 3/1963 | Young | 220/306 |
|---|---|---|---|
| 3,598,157 | 8/1971 | Farr et al. | 285/177 |
| 3,610,306 | 10/1971 | Summers | 220/306 |
| 3,680,896 | 8/1972 | Cupit | 285/177 |
| 3,688,942 | 9/1972 | Mitchell et al. | 220/306 |
| 3,737,002 | 6/1973 | Yotsumoto | 55/385 B |
| 3,791,112 | 2/1974 | Lidstone | 55/385 B |
| 3,805,994 | 4/1974 | Cherry et al. | 220/306 |
| 3,959,891 | 6/1976 | Burkall | 55/509 |
| 3,987,862 | 10/1976 | Lidstone | 55/385 B |

Primary Examiner—Frank W. Lutter
Assistant Examiner—David L. Lacey
Attorney, Agent, or Firm—Ken C. Decker; William N. Antonis

[57] ABSTRACT

A rain hood for the air intake system of an internal combustion engine includes a body and a cover. The body includes a tubular portion which is received within the open end of an air intake tube and an outwardly flared conical portion which extends from the tubular portion and is provided with a lattice-work structure defining openings to permit substantially uninhibited flow of ambient air into the open end of the intake tube. The cover closes the open end of the flared portion of the body, and includes a closing portion closing the open end of the flared portion and a circumferentially extending portion which extends from the closing portion and circumscribes the flared portion. The cover and the body carry a locking mechanism which locks the body to the cover so that the cover cannot be removed from the body once it is installed thereon.

2 Claims, 3 Drawing Figures

U.S. Patent  Dec. 26, 1978  4,131,441
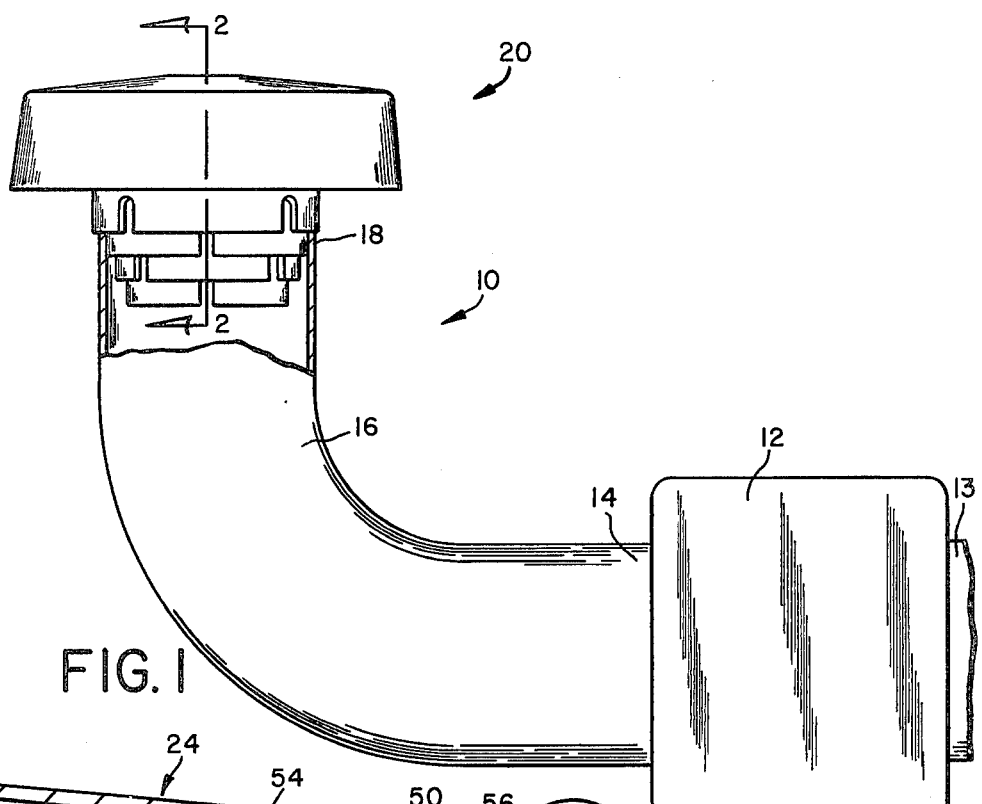
FIG. 1
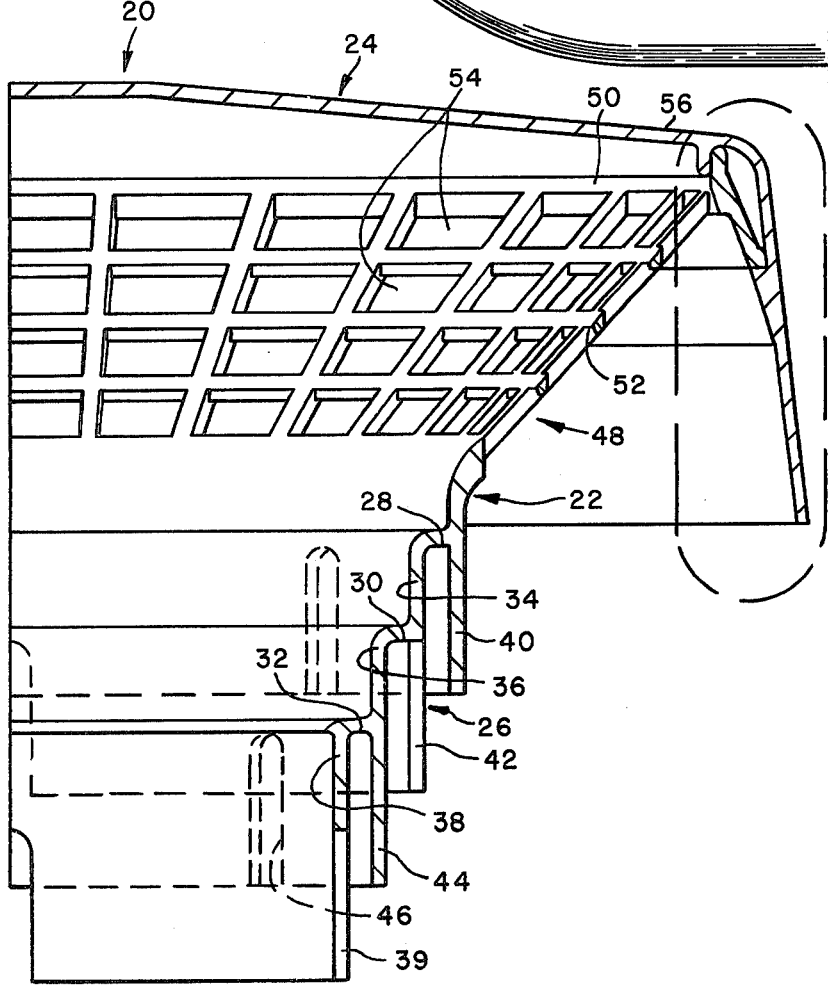
FIG. 2
FIG. 3

MULTI-SIZE RAIN HOOD

BACKGROUND OF THE INVENTION

The air intake system for a heavy duty vehicle engine usually includes a relatively large heavy duty air cleaner which may be mounted remote from the engine, and an air intake tube which communicates ambient air into the air cleaner. In order to prevent rain and other foreign material from entering the air intake tube and thereby gaining access to the air cleaner when the vehicle is operated under adverse conditions, a rain hood is provided at the open end of the intake tube. Conventional heavy duty vehicle air intake systems have air intake tubes of at least seven different diameters, thereby requiring seven different models of rain hoods in order to accommodate each of the seven different sizes of air intake tubes. Obviously, this situation provides an inventory and stocking problem for manufacturers and distributors of air intake system components.

SUMMARY OF THE INVENTION

The present invention provides a two-piece rain hood comprising a body and a cover for the open end of the body. The body includes a stepped tubular portion which can accommodate three or four different diameters of air intake tubes, and a flared portion which includes a lattice-work structure to provide openings for communication of ambient air into the intake tube. The open end of the flared portion is covered by the cover, and a locking arrangement is provided so that once the body and cover are assembled, they cannot be separated.

Therefore, an important object of my invention is to simplify the stocking and inventory problems of manufacturers and distributors of air intake system components by reducing the number of required rain hoods from the seven required at present to only two different models.

Another important object of my invention is to provide a two-piece rain hood, in which a body portion is used with a separate cover that is joined to the body by a unique locking arrangement.

Still another important object of my invention is to provide a unique locking arrangement which connects the body and cover of my rain hood so that the cover cannot be removed from the body once they are assembled.

DESCRIPTION OF THE DRAWINGS

FIG. 1 is a schematic illustration of an air intake system made pursuant to the teachings of my present invention and utilizing the unique rain hood described herein;

FIG. 2 is a fragmentary cross-sectional view of my rain hood taken substantially along lines 2—2 of FIG. 1; and FIG. 3 is an enlarged detailed view of the circumscribed portion of FIG. 2.

DETAILED DESCRIPTION

Referring now to the drawings, an air intake system for a heavy duty vehicle engine is generally indicated by the numeral 10 and includes an air cleaner 12 of conventional construction having an outlet 13 which is communicated with the carburetor of the vehicle engine and an inlet 14 communicating with an intake tube 16 having an open end at 18. The rain hood generally indicated by the numeral 20 which is the subject of the present invention is received in the open end 18 of the intake tube 16 and prevents rain from entering the intake tube 16 and thereby damaging the air cleaner 12.

Referring now to FIG. 2, the air cleaner 20 includes a body 22 and a cover 24. The body 22 includes a tubular portion 26 which is stepped as at 28, 30 and 32 to define larger and smaller diameter portions of the tubular portion 26. The axially extending annular inner walls 34, 36, 38 and and 39 defined by the stepped portions are designed to accommodate four different diameters of conventional air intake tubes for air intake systems of vehicle engines. Each of the walls 34, 36, 38 and 39 cooperate with outer walls 40, 42 and 44, to define annular grooves which receive the end of the corresponding intake tubes as illustrated in FIG. 1. Each of the walls 38, 40, 42 and 44 are provided with axially extending slots 46 to permit the walls to expand slightly to accommodate the open end of the air intake tube.

The body 22 also includes a conically shaped flared portion 48, one end of which extends from the tubular portion 26, and the other end of which terminates in an open end 50. The flared portion 48 is of a lattice-work construction as at 52 to define openings 54 which permit substantially uninhibited communication of ambient air into the body 22 and therefore into the open end of the air intake tube. The cover 24 consists of a closing portion 56 which closes the open end 50 of the flared portion 48 and a circumferentially extending portion 58 which projects from the closing portion 56 which generally circumscribes the flared portion 48 of the body 22.

The cover 24 is retained on the body 22 by locking mechanism generally indicated by the numeral 60 as is most clearly seen in FIG. 3. A pair of circumferentially extending, axially diverging legs 62, 64 extend from the open end 50 of the flared portion 48 of the body 22. A circumferentially extending shoulder 66 is provided on the circumferentially extending portion or ramp 58, which defines a wedge-shaped portion 68 on the inner circumferential wall of the portion 58 that provides a smooth transition between the shoulder 66 and the inner wall of portion 58. The outer surface 70 of a circumferentially extending ring 72 on the inner surface of the closing portion 56 of the cover 24 cooperates with the inner wall of the cover to define a stop against which the leg 64 bears when the end of the leg 62 is engaged with the shoulder 66. As illustrated in FIG. 3, the cover 24 is assembled to the body portion 22 by first aligning the cover 24 axially with the body 22, so that the leg 62 wipes along the inner surface of the circumferentially extending portion 58 as the cover is urged upon the body. As the leg 62 wipes up the wedge-shaped portion or ramp 68 and snaps onto the shoulder 66, the leg 64 engages the surface 70 of the ring 72, thereby preventing removal of the cover from the body once it is assembled thereto, since an axially applied force on the cover will be resisted by engagement of the leg 62 with the shoulder 66, and the engagement of the leg 64 with the stop 70 will prevent radial inward movement of the leg 64.

An important feature of my invention is that it substantially reduces the stocking requirements for rain hoods of manufacturers and distributors of air intake systems for heavy duty vehicles. As explained hereinabove, distributors must now stock seven different rain hoods for the seven different diameters of air intake tubes commonly used on existing vehicles. On the other hand, only four components of the air hood made pursuant to the teachings of my present invention need be stocked. It is contemplated that a single body portion 22 will be provided with steps, such as the steps 28, 30 and 32, to accommodate the four smaller sizes of air intake tubes, and that another type of body portion 22, identical to that shown in the drawings except for the size of the tubular portion 26, will include steps to accommodate the three largest sizes of air intake tubes. Of course, different corresponding covers 56 must be used with the corresponding body portions, thereby permitting a total of four components to accommodate a range of seven different sizes of air intake tubes.

I claim:

1. A two-piece rain hood for the air intake system of an internal combustion engine comprising an annular body having an open end and a cover, said body having a tubular portion and a radially outwardly flared portion extending from the tubular portion, said cover joining with said body for closing said open end, said flared portion including a substantially conical wall having structure defining openings through which air communicates, said cover and said body including means locking said cover to said body, said locking means preventing separation of the cover from the body after the cover is mounted on the body, said cover including a closing portion closing said open end, and a circumferentially extending portion projecting from the closing portion and circumscribing the flared portion, said means for locking the cover on the body being positioned on the open end of the flared portion and on the cover at the juncture of the closing portion and the circumferentially extending portion thereof, said conical wall terminating in a pair of circumferentially extending legs diverging from a common point at the juncture of said legs with the conical wall, a circumferentially extending shoulder on the circumferentially extending portion of the cover facing the closing portion of the cover, and a circumferentially extending ring on the closing portion of the cover, one of said legs engaging said shoulder, the other leg engaging said ring which prevents radial inward movement of the other leg toward the center of said cover.

2. The two-piece rain hood of claim 1 wherein said tubular portion is stepped to define larger and smaller diameter sections to thereby accommodate intake tubes of various diameters.

* * * * *